United States Patent
Entwistle

(10) Patent No.: US 11,573,302 B2
(45) Date of Patent: Feb. 7, 2023

(54) LIDAR SYSTEM COMPRISING A GEIGER-MODE AVALANCHE PHOTODIODE-BASED RECEIVER HAVING PIXELS WITH MULTIPLE-RETURN CAPABILITY

(71) Applicant: ARGO AI, LLC, Pittsburgh, PA (US)

(72) Inventor: Mark D. Entwistle, New Egypt, NJ (US)

(73) Assignee: ARGO AI, LLC, Pittsburgh, PA (US)

( * ) Notice: Subject to any disclaimer, the term of this patent is extended or adjusted under 35 U.S.C. 154(b) by 640 days.

(21) Appl. No.: 16/655,796

(22) Filed: Oct. 17, 2019

(65) Prior Publication Data
US 2021/0116550 A1 Apr. 22, 2021

(51) Int. Cl.
*G01S 7/4865* (2020.01)
*G01S 7/481* (2006.01)
*G01S 7/48* (2006.01)

(52) U.S. Cl.
CPC .......... *G01S 7/4865* (2013.01); *G01S 7/4808* (2013.01); *G01S 7/4816* (2013.01)

(58) Field of Classification Search
None
See application file for complete search history.

(56) References Cited

U.S. PATENT DOCUMENTS

| | | | | |
|---|---|---|---|---|
| 6,421,033 B1 * | 7/2002 | Williams | ............. | G09G 3/3233 345/55 |
| 9,625,580 B2 * | 4/2017 | Kotelnikov | ............. | G01S 7/487 |
| 10,386,487 B1 * | 8/2019 | Wilton | ................... | G01S 7/4865 |
| 10,620,301 B2 * | 4/2020 | Wilton | ................... | G01S 7/4865 |
| 10,732,281 B2 * | 8/2020 | LaChapelle | ............. | G01S 7/497 |
| 10,739,189 B2 * | 8/2020 | Pacala | .................... | G01J 1/4204 |
| 10,801,886 B2 * | 10/2020 | Mandai | ................... | G01S 17/08 |

(Continued)

FOREIGN PATENT DOCUMENTS

| CN | 110213511 A | 9/2019 |
|---|---|---|
| KR | 10-2019-0104478 | 9/2019 |
| WO | 2019/115839 | 6/2019 |

OTHER PUBLICATIONS

International Search Report and Written Opinion issued on PCT Patent Application No. PCT/US2020/056352 dated Feb. 9, 2021.

(Continued)

*Primary Examiner* — Reza Aghevli
(74) *Attorney, Agent, or Firm* — Sterne, Kessler, Goldstein & Fox P.L.L.C.

(57) ABSTRACT

Disclosed are Geiger-mode avalanche-photodiode-based LiDAR systems and methods that interrogate a detection region with a periodic series of optical pulses whose reflections are detected via a receiver comprising multiple Geiger-mode avalanche-photodiode-based pixels. The pixels of the receiver are configured to asynchronously disarm and rearm after absorption of a reflection. As a result, each pixel can detect multiple reflections of the same optical pulse during a single detection frame whose duration is defined by the periodicity of the series of optical pulses. Furthermore, each pixel can store time-of-flight data for each of multiple reflections detected during a detection frame. Each individual pixel of the receiver, therefore, is not blinded and inoperative for the remainder of a detection frame once it detects a first reflection.

19 Claims, 10 Drawing Sheets

(56) References Cited

U.S. PATENT DOCUMENTS

| | | | | |
|---|---|---|---|---|
| 10,891,744 | B1* | 1/2021 | Wyffels | G01S 7/4808 |
| 2010/0020306 | A1* | 1/2010 | Hall | H01S 5/0428 |
| | | | | 356/5.01 |
| 2011/0216304 | A1* | 9/2011 | Hall | G01S 17/89 |
| | | | | 356/4.01 |
| 2013/0099922 | A1* | 4/2013 | Lohbihler | G08B 13/184 |
| | | | | 340/539.17 |
| 2015/0009485 | A1 | 1/2015 | Mheen et al. | |
| 2015/0192676 | A1* | 7/2015 | Kotelnikov | G01S 17/89 |
| | | | | 356/5.03 |
| 2016/0139266 | A1* | 5/2016 | Montoya | G01S 17/42 |
| | | | | 356/5.01 |
| 2018/0299552 | A1* | 10/2018 | Shu | G01S 7/4816 |
| 2018/0364337 | A1* | 12/2018 | Wilton | G01S 17/10 |
| 2020/0003876 | A1* | 1/2020 | Zalud | G01S 7/4863 |
| 2020/0033481 | A1* | 1/2020 | Lee | G01S 17/42 |
| 2020/0174120 | A1* | 6/2020 | Steigemann | G01S 17/08 |
| 2020/0284883 | A1* | 9/2020 | Ferreira | G01S 17/10 |
| 2020/0300975 | A1* | 9/2020 | Okuni | G01S 17/10 |
| 2020/0300984 | A1* | 9/2020 | Matsuura | G01S 7/4861 |
| 2020/0300987 | A1* | 9/2020 | Ta | G01S 17/42 |
| 2020/0300988 | A1* | 9/2020 | Okuni | G01S 7/4873 |
| 2020/0348416 | A1* | 11/2020 | Sakaguchi | G01S 17/10 |
| 2022/0035002 | A1* | 2/2022 | Davis | G01S 7/4815 |
| 2022/0035007 | A1* | 2/2022 | Davis | G01S 7/4814 |
| 2022/0050188 | A1* | 2/2022 | Laverne | G01J 3/0289 |
| 2022/0091234 | A1* | 3/2022 | Bennington | G01S 7/484 |
| 2022/0107400 | A1* | 4/2022 | Hostetler | G01S 7/4863 |

OTHER PUBLICATIONS

"Light Detection and Ranging (LIDAR) Sensor Model Supporting Precise Geopositioning", "CSMWG Information Guidance Document", Aug. 1, 2011, pp. 1-83, vol. NGA.SIG.0004_1.1, Publisher: National Geospatial-Intelligence Agency.

Charbon et al., "SPAD-Based Sensors", "F. Remondino and D. Stoppa (eds ), TOF Range-Imaging Cameras, DOI: 10.1007/978-3-642-27523-4.sub.-2, Springer-Verlag Berlin Heidelberg 2013".

Cristiano Niclass et al., "Design and charactarization of a 256x64-pixel single-photon imager in CMOS for a MEMS-based laser scanning time-Of-flight sensor", "Optics Express", May 10, 2012, vol. 20, No. 11, Publisher: Optical Society of America, Published in: JP.

Ito, et al., "System design and performance aracterization of a MEMS-based laser scanning time-of-flight sensor based on a 256x64-pixel single-photon imager", 2013, pp. 1-15, Publisher: IEEE; Applied Optics Lab., Toyota Central R&D Labs, Inc.

Optics and Photonics, "Seeing in the Dark: Defense Applicationsof IR imaging dated Apr. 2011", "http://www.osa-opn/home/articles/volume.sub.--22/issue.sub.--4/features/-seeing.sub.-in.sub.--the.sub.--dark.sub.--defense.sub.--applications.sub - --of.sub.-ir.sub.-ima/", vol. 22 issue 4.

William C. Stone et al., "Performance Analysis of Next-Generation LADAR for Manufacturing, Construction, and Mobility", May 1, 2004, vol. NISTIR 7117, Publisher: Naitonal Institute of Standards and Technology, Published in: us.

William E. Clifton et al., "Medium Altitude Airborne Geiger-mode Mapping Lidar System", doi: 10.1117/12.2193827, "Laser Radar Technology and Applications XX", Jun. 9, 2015, vol. 9465, 946506, Publisher: Proc of SPIE, Published in: US.

Extended European Search Report and Opinion directed to related European Patent Application No. 20875925.8, dated Nov. 7, 2022; 10 pages.

Milstein, A.B., et al.: "Acquisition algorithm for direct-detection ladars with Geiger-mode avalanche photodiodes", Applied Optics, Optical Society of America, Washington, DC, US, vol. 47, No. 2, Jan. 10, 2008 (Jan. 10, 2008), pp. 286-311.

* cited by examiner

LIDAR SYSTEM COMPRISING A GEIGER-MODE AVALANCHE PHOTODIODE-BASED RECEIVER HAVING PIXELS WITH MULTIPLE-RETURN CAPABILITY

TECHNICAL FIELD

The present disclosure relates to scanning optical ranging and detection systems and methods in general, and, more particularly, to time-of-flight Light Detection And Ranging (LiDAR) systems and methods employing Geiger-mode avalanche photodiodes.

BACKGROUND

Light Detection And Ranging (LiDAR) systems enable measurement of distances of one or more objects within an environment without physically touching those objects. Time-of-Flight (TOF) LiDAR estimates the range from a source to an object by sending an optical pulse (typically, a laser pulse) toward the object at a first time, detecting a reflection of the optical pulse off the object at a second time, and determining the difference between the first and second times, which represents the time required for the light to travel to and from the object (i.e., the time-of-flight for the optical pulse). TOF LiDAR systems are attractive for use in many applications, such as driverless automobiles, farm equipment, and the like.

SUMMARY

An advance is made in the art according to aspects of the present disclosure directed to Geiger-mode avalanche-photodiode-based LiDAR systems and methods that enable each pixel of a multi-pixel detector to detect multiple reflections during each detection frame of an image frame.

Like systems and methods of the prior art, embodiments in accordance with the present disclosure interrogate a detection region using a pulsed laser and a receiver comprising a pixel array in which each pixel includes a Geiger-mode avalanche photodiode. The pulsed laser directs a periodic series of optical pulses into the detection region and the receiver detects reflections of the optical pulses from objects within the detection region during each of a series of detection frames, where the beginning of each detection frame is based on the transmission of a different optical pulse. When at least some of an optical pulse is reflected from an object within the detection region back to a pixel of the detector, an avalanche-detection event is triggered at the avalanche photodiode of that pixel and the range to an object is estimated based on the time between transmission of that optical pulse and the time at which the avalanche-detection event occurs (i.e., the time of flight for the photon or photons contained in the reflection). Unfortunately, in prior-art TOF LiDAR systems, once an avalanche-detection event is triggered during a detection frame, that pixel is rendered unusable until it is reset at the start of the next detection frame. As a result, each pixel of the detector can only detect one reflection per detection frame and is blind for the remainder of any detection frame in which it has detected a reflection.

In sharp contrast to the prior art, a LiDAR system in accordance with the present disclosure includes a receiver whose pixels include circuitry that enables each pixel to detect more than one reflection during a single detection frame—referred to as "multiple-return capability." As a result, the pixels are not blinded for the remainder of a detection frame after they detect one reflection. The circuitry included in each pixel enables asynchronous automatic resetting of its Geiger-mode avalanche photodiode after each avalanche-detection event so it can be quickly disarmed to stop the avalanche event and then rearmed to enable it to detect another reflection. Each pixel also includes a plurality of registers for holding time stamps associated with each avalanche-detection event that occurs within a single detection frame, where each time stamp is indicative of the round-trip time-of-flight of the optical pulse between the LiDAR system and the object from which a reflection was received.

An illustrative embodiment in accordance with the present disclosure is a TOF LiDAR system comprising a source for transmitting a periodic series of optical pulses toward a detection field, a receiver for detecting reflections from a detection region, and a processor for providing gating and control signals to the source and receiver and estimating ranges for one or more objects in the detection region based on TOF data received from the receiver.

The receiver comprises a pixel array in which each pixel includes a Geiger-mode avalanche photodiode for detecting reflections from a detection region, a gating-signal controller for automatically disarming the GmAPD after an avalanche-detection event in response to absorption of a reflection and rearming it to enable detection of a subsequent reflection, a TOF counter for tracking the time between transmission of an optical pulse and detection of its reflections, and a TOF register module for storing TOF data associated with a plurality of reflections detected by the GmAPD during a single detection frame.

In some embodiments, the gating signal controller includes a hold-off timer and an ARM timer. The hold-off timer initiates automatic, asynchronous disarming and quenching of the GmAPD upon detection of an avalanche-detection event. The ARM timer initiates asynchronous rearming of the GmAPD in response to a signal from the hold-off timer or synchronous arming of the GmAPD in response to a global ARM signal from the processor.

In some embodiments, the TOF register module includes two register banks and a controller. One register bank includes multiple TOF registers for storing time-of-flight information for reflections detected during an active detection frame and the second bank includes TOF registers for reading out time-of-flight information for reflections detected during a previous detection frame.

An embodiment in accordance with the present disclosure comprises a light detection and ranging (LiDAR) system comprising: an optical source for transmitting a series of optical pulses toward a detection region, wherein the optical pulses of the series are periodic and separated by a period, T1; and a receiver comprising a plurality of pixels for detecting reflections of the optical pulses during each of a plurality of detection frames, each detection frame having a duration based on T1 and having a start time based on the transmission of a different optical pulse of the series thereof, wherein each pixel includes: (i) a Geiger-mode avalanche photodiode (GmAPD) for detecting reflections of the optical pulses from the detection region; (ii) a gating-signal controller for arming the GmAPD to put it in Geiger mode and disarming the GmAPD to take it out of Geiger mode; (iii) a counter for tracking the time-of-flight (TOF) between the transmission of an optical pulse of the series thereof and the detection of one or more reflections of the optical pulse of the series thereof; and (iv) a TOF register module for storing TOF data associated with the one or more reflections of the optical pulse of the series thereof; wherein the LiDAR system is characterized by each pixel of the receiver being configured such that it is operative for detecting a plurality of reflections of each optical pulse of the series thereof during each detection frame of the plurality thereof.

Another embodiment in accordance with the present disclosure is a method for estimating a range for at least one object in a detection region, the method comprising: transmitting a series of optical pulses toward the detection region, wherein the optical pulses of the series are periodic and separated by a period, T1; defining a plurality of detection frames having duration T1, wherein each detection frame has a start time based on the transmission of a different optical pulse of the series thereof; receiving a first reflection of a first optical pulse of the series thereof at a first pixel of a receiver during a first detection frame of the plurality thereof, wherein the first pixel includes a first Geiger-mode avalanche photodiode (GmAPD), and wherein receipt of the first reflection triggers a first avalanche-detection event; asynchronously disarming the first GmAPD to quench the first avalanche-detection event; and asynchronously arming the first GmAPD to enable a second avalanche-detection event in response to receipt of a second reflection of the first optical pulse of the series thereof during the first detection frame.

DETAILED DESCRIPTION

Figure 1A:
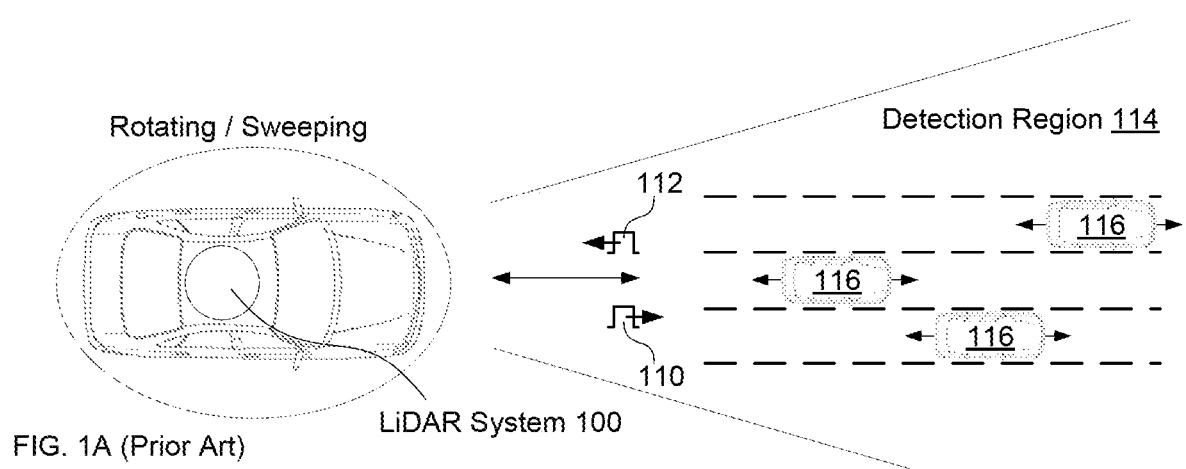
FIGS. 1A-B depict schematic drawings of a TOF LiDAR system in accordance with the prior art.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

The following terms are defined for use in this Specification, including the appended claims:

detection region—also known as field of view is defined as an area of interest that is imaged during an image frame;

image frame—also known as frame integration period (duration) and data integration period (duration) is defined as a time period during which a detection region is imaged. An image frame typically includes a plurality of detection frames;

detection frame also known as laser pulse period or optical pulse period is defined as the time period between transmission of optical pulses from a transmitter; when used referring to time between GmAPD arm pulses, frame period is oftentimes used;

asynchronous arming is defined as arming of the Geiger-mode avalanche photodiode of a pixel independently of the arming of the Geiger-mode avalanche photodiodes of other pixels of a multi-pixel receiver;

asynchronous disarming is defined as disarming of the Geiger-mode avalanche photodiode of a pixel independently of the disarming of the Geiger-mode avalanche photodiodes of other pixels of a multi-pixel receiver;

multiple-return capability is defined as the capability for detecting more than one reflection of the same optical pulse at an individual pixel during a single detection frame.

By way of some additional background, we begin by noting that advances in LiDAR systems and methods have enabled practitioners to scan large areas while collecting billions of data points, each with a precise latitude, longitude, and elevation (x, y, z) values within a local (relative) coordinate system. This aggregation of the billions of data points is referred to as a point cloud data set. Practitioners subsequently extract object locations from the point clouds data set and use that location information for subsequent decision making.

Figure 1B:
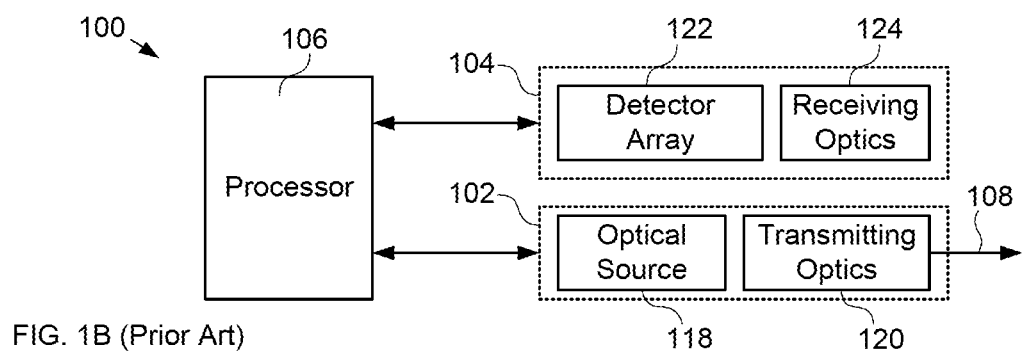

FIGS. 1A-B depict schematic drawings of a TOF LiDAR system in accordance with the prior art. System 100 is a GmAPD-based LiDAR system operative for collecting one or more point-cloud data sets for determining the state of a detection region that surrounds it. As depicted in FIG. 1B, system 100 generally comprises transmitter 102, receiver 104, and processor 106.

Transmitter 102 provides output signal 108 and includes an optical source 118 and transmitting optics 120 for directing output signal 108 toward detection region 114. Operationally, transmitter 102 periodically transmits an interrogating signal comprising a train of optical pulses 110 into detection region (or field of view) 114. In the depicted example, optical source 118 is a diode laser that emits at train of optical pulses 110 exhibiting a period T1 in response to drive signal(s) from processor 106. Optical pulses 110 have a wavelength and intensity suitable for interrogating the detection region. Typically, optical pulses 110 have a wavelength within the range of approximately 900 nm to approximately 2000 nm; however, other usable wavelengths are known in the art.

As each optical pulse 110 propagates through detection region 114, objects 116 may reflect a portion of the optical energy of the optical pulse back toward receiver 104 as reflection(s) 112.

Receiver 104 includes detector array 122 and receiving optics 124 for directing reflections 112 to the elements of detector array 122. Each pixel of detector array 122 includes a Geiger-mode avalanche photodiode (GmAPD) that, when provided a bias voltage equal to or greater than its breakdown voltage (i.e., when it is "armed"), can quickly produce an electrical signal in response to the detection of even a single photon—allowing for sub-nsec-precision photon-flight-time measurements. When a pixel is armed, it may detect a low-intensity reflection 112 of optical pulse 110 and output an electrical signal to be detected and subsequently used by the processing system.

Processor 106 is a processing system and controller configured to provide control, gating, and timing signals to transmitter 102 and receiver 104, as well as receive electrical signals from receiver 104 and develop a map of detection region 114 based on the electrical signals. Typically, processor 106 includes a computer system for executing instructions in accordance with the present disclosure, memory (e.g., computer-readable medium, such as volatile or non-volatile memory, etc.), one or more storage devices (e.g., flash memory, disk drives, optical-disk devices, tape devices employing magnetic, optical, or other recording technologies, etc.), and input/output structure, which can include one or more transmitters, receivers, and optical controls, light emitters, light receivers, timing and control functions, filters, and the like. Processor 106 may be a single or multi-core processor, which is connected with the other components of system 100 via one or more busses.

As shown in FIG. 1A, system 100 may be mounted on movable platforms such as an automobile. While not specifically shown in FIG. 1A, such LiDAR system(s) may be mounted on fixed or other movable platforms including land, sea, airborne and/or space vehicles. Still further, such platforms may be configured or individually combined to sweep or scan over a large volume such that a full 360-degree environmental view may be made.

Figure 2:
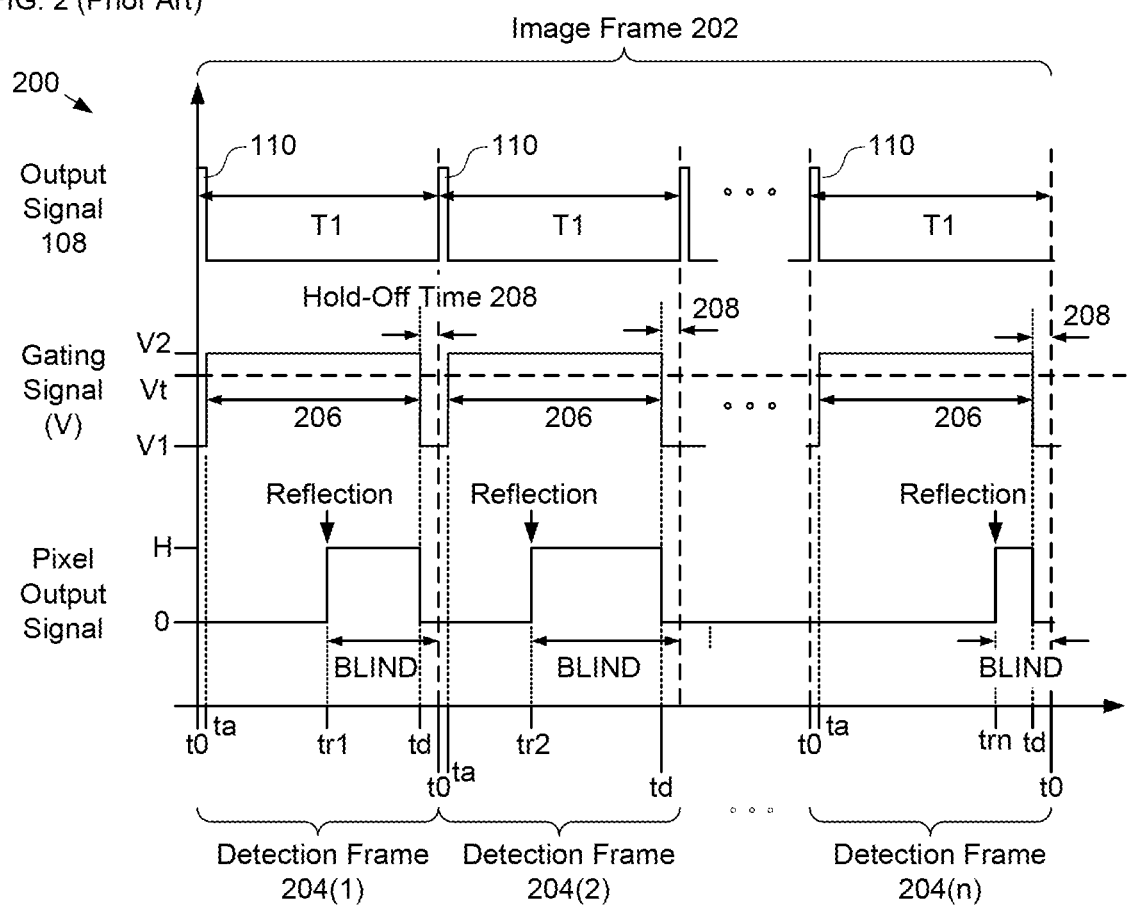
FIG. 2 depicts an illustrative timing diagram including a plurality of waveforms of a representative image frame for one pixel of a receiver of a TOF LiDAR system, such as that shown and described previously in FIGS. 1A-B.

FIG. 2 depicts an illustrative timing diagram including a plurality of waveforms of a representative image frame for every pixel of a receiver of a conventional TOF LiDAR system, such as that shown and described previously in FIGS. 1A-B. As seen in timing diagram 200, image frame 202 includes a number of substantially identical detection frames 204(1) through 204(n), each of which exhibits the same duration. In this illustrative example, the duration of each detection frame is equal to the duration of period, T1, of the optical-pulse train of output signal 108.

For a given image frame, each individual detection frame 204(1), 204(2), . . . 204(n) (referred to, collectively, as detection frames 204) has a start time, t0, which is synchronized with the transmission of a respective optical pulse of an interrogating signal. For example, optical pulse 110(1) is transmitted at time t0 of detection frame 204(1), optical pulse 110(2) is transmitted at time t0 of detection frame 204(2), and optical pulse 110(n) is transmitted at time t0 of detection frame 204(n). Note that in some embodiments, the start time of each detection frame may different than the transmission time of its respective optical pulse and that the specific number of detection frames and optical pulses may vary from the number(s) shown in this illustrative example.

At arming time ta, processor 106 provides a gating signal to all of the GmAPD-based pixels of receiver 104, where the gating signal controls the voltage with which each GmAPD is biased. In the depicted example, the gating signal raises the bias voltage of the GmAPD-based pixels from V1 to V2 at arming time ta, where V1 is a voltage that is lower than the threshold (i.e., breakdown) voltage of each GmAPD, while V2 is a voltage higher than the threshold voltage, Vt. As a result, raising the bias voltage to V2 puts the pixels into Geiger mode, which arms them to enable each pixel to detect receipt of a single photon of light. As shown in FIG. 2, arming time ta may occur at the end of a delay period. In the depicted example, in each detection frame, this delay period is very short such that arming time ta is only slightly delayed from the transmission of its respective optical pulse 110 at time t0. In some cases, a longer delay period is used in a detection frame to enable the detector to selectively interrogate a portion of detection region 114 that is located a greater distance from system 100.

During operation, gating signal remains high (i.e., at V2) throughout gating period 206, enabling the pixel to detect the arrival of a photon at any time during the gating period. Gating period 206 ends for all of the pixels of receiver 104 at disarming time td, at which time the gating signal is reduced below threshold voltage Vt to voltage V1, thereby disarming the GmAPDs of receiver 104. As will be understood and appreciated by those skilled in the art, the time between ta and td (i.e., the duration of the gating period) generally defines the extent (range) of detection region 114 that is scanned during each detection frame. Upon reduction of gating signal below threshold voltage, avalanche events occurring in the GmAPDs are stopped (i.e., avalanche currents are quenched), thereby enabling the GmAPDs to be rearmed at the start of the gating period 206 of the next detection frame.

As would be apparent to one skilled in the art, typically, the GmAPD-based pixels of a receiver are disarmed slightly before the end of each detection frame (as shown in FIG. 2), thereby defining hold-off time 208, which allows for trapped charges in the GmAPDs to detrap and recombine while the GmAPD is not in Geiger mode. As will be appreciated by those skilled in the art, such hold-off time advantageously avoids spurious avalanche events, such as dark counts due to afterpulsing.

As noted above, the pixel is able to detect a reflection 112 that arrives at any time during gating period 206. For example, in detection frames 204(1), 204(2), and 204(3), a reflection 112 is received at times tr1, tr2, and trn, respectively, triggering an avalanche-detection event in the GmAPD of the pixel that drives its output signal high.

It should be noted that the pixels of receiver 104 operate in synchronous fashion. In other words, they are all armed and disarmed at the same time during each detection frame.

While the operational physics of GmAPD detectors are known and understood, it is notable that the use of GmAPD detectors is generally not concerned with multiplication noise but rather with detection probability—namely the probability that an incident photon will produce a detection event. Such probability is the product of the quantum efficiency, which is the probability that a photon will be absorbed in the active region of the device, and the avalanche probability which is the probability that a photoelectron (or hole) will initiate an avalanche that does not terminate prematurely.

Furthermore, it is noted that Geiger-mode detection events do not provide intensity information. An electrical pulse produced by the recombination of free-free carrier pairs resulting from the absorption of a photon is indistinguishable from an electrical pulse generated by the recombination of free-free carrier pairs resulting from detrapping of trapped charges, the absorption of many photons simultaneously, or by subsequently absorbed photons. As a result, as indicated in FIG. 2, once an avalanche-detection event is triggered by the first photon absorbed during a detection frame, the output signal of the pixel remains high until the GmAPD is quenched at disarm time td—whether or not additional photons are subsequently received. Each pixel of detector array 122, therefore, can detect only one reflection per detection frame and is blind to the arrival of additional reflections for the remainder of that detection frame. As a result, objects closer to system 100 can obscure or completely hide objects further away. Advantageously, methods, systems and techniques according to the present disclosure mitigate this problem.

Figure 3:
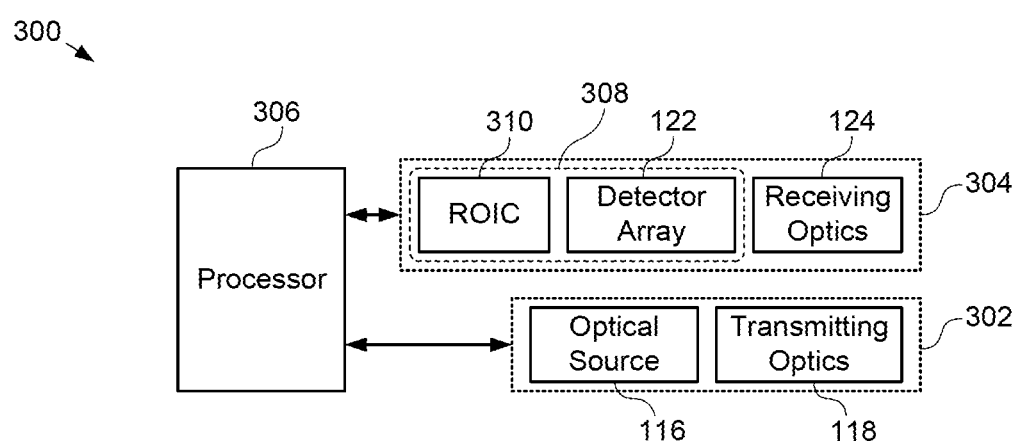
FIG. 3 depicts a schematic drawing of an illustrative embodiment of a LiDAR system in accordance with the present disclosure.

FIG. 3 depicts a schematic drawing of an illustrative embodiment of a LiDAR system in accordance with the present disclosure. System 300 is analogous to system 100 described above; however, system 300 includes a receiver having multiple-return capability in that it is configured such that it can detect multiple reflections from detection region 114 during any single detection frame. As a result, system 300 mitigates blockage and/or obscuration of objects within detection region 114. System 300 generally comprises transmitter 302, receiver 304, and processing system/controller 306.

Transmitter 302 is analogous to transmitter 102 described above and transmits a series of optical pulses 110 into detection region 114.

Receiver 304 includes detector 308 and receiving optics 124 for directing reflections 112 to the pixels of detector 308.

Processing system/controller 306 (hereinafter referred to as processor 306) is analogous to processor 106 described above; however, processor 306 is also configured to enable its receipt of TOF data for multiple reflections within each detection frame and develop a map of detection region 114 based on the TOF data.

Figure 4:
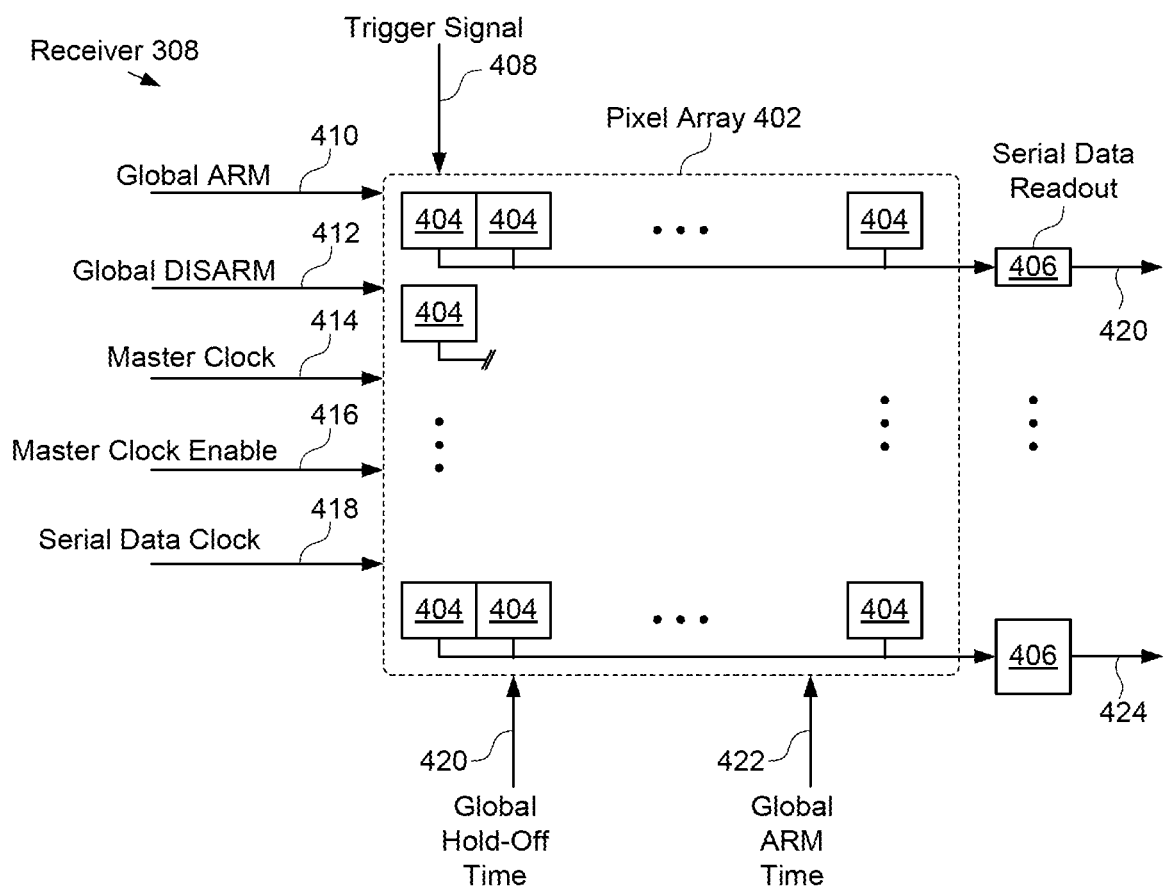
FIG. 4 depicts a schematic drawing of a detector in accordance with the illustrative embodiment.

FIG. 4 depicts a schematic drawing of a detector in accordance with the illustrative embodiment. Detector 308 is collectively defined by detector array 122 and read-out integrated circuit (ROIC) 310 and includes pixel array 402 and a plurality of serial data readouts 406. In the depicted example, pixel array 402 is a two-dimensional array of substantially identical pixels 404 comprising a GmAPD 502 and associated ROIC circuitry, where the pixels are arranged in an 1×512 column arrangement to realize 64 pixels per output channel and 8 output channels whose output data 424 is readout via a separate serial data output 406.

As discussed in more detail below, each of pixels 404 is configurable such that it can detect one or more reflections 112 of optical pulse 110, store time-of-flight (TOF) information associated with multiple reflections received during individual detection frames, and provide the TOF information to processor 306.

As indicated in FIG. 4, pixel array 402 receives several global signals from processor 306, each of which is provided to every pixel 404. Specifically, in the depicted example, pixel array 402 receives global signals that include trigger signal 408, global ARM 410, global DISARM 412, master clock 414, master-clock enable 416, separate serial data clock 418, global hold-off time 420, and global ARM time 422. In some embodiments, at least one of global signals 408 through 422 is provided to pixel array 402 by a circuit element other than processor 306, such as one or more controller circuits included in ROIC 310, a dedicated controller that is operatively coupled with each of processor 306 and pixel array 402, and the like.

Figure 5:
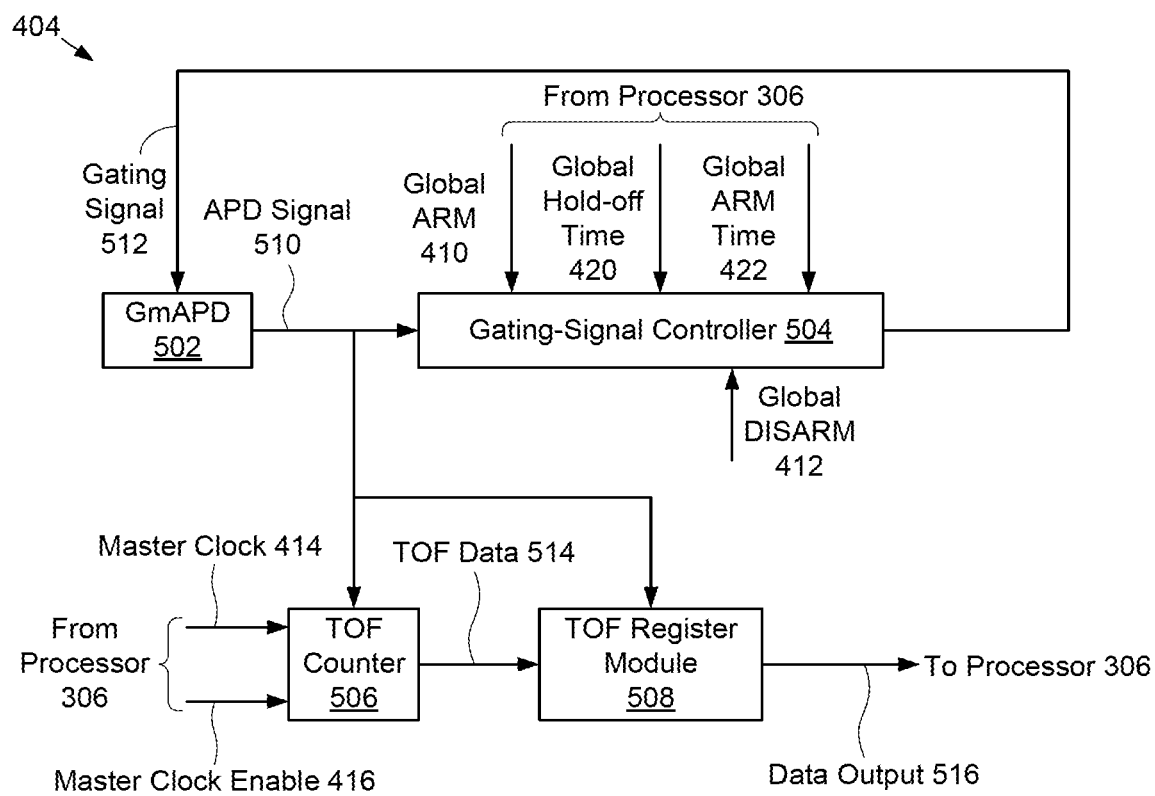
FIG. 5 depicts a functional block diagram of a detector pixel in accordance with the illustrative embodiment.

FIG. 5 depicts a functional block diagram of a detector pixel having multiple-return capability in accordance with the illustrative embodiment. Pixel 404 includes GmAPD 502, Gating-Signal Controller 504, TOF counter 506, and TOF register Module 508.

Gating-signal controller 504 is an electronic circuit module operative for controlling whether GmAPD 502 is in Geiger mode. Gating-signal controller 504 controls the state of GmAPD 502 based on APD signal 510, as well as a pair of global signals received from processor 306—namely, global hold-off time 420 and global ARM time 422. Gating-signal controller 504 is configured such that it can detect an avalanche-detection event at GmAPD 502, quickly quench the avalanche, and rearm the GmAPD. As a result, the inclusion of gating-signal controller enables the detection of multiple reflections by a single pixel during the same detection frame.

TOF counter 506 is operative for keeping a running count of clock cycles on master clock 414. TOF counter 506 is reset at the start of each detection frame via master clock enable 416.

TOF register module 508 includes a plurality of TOF registers and control circuitry for storing the count of TOF counter 506 in a different TOF register each time a reflection 112 is detected at GmAPD 502 in a detection frame, thereby enabling the registration of time-of-flight information for each of a plurality of reflections 112 received at GmAPD 502 during a single detection frame. TOF register module 508 provides stored TOF data for each reflection 112 detected during a single detection to processor 306 via data output signal 516.

The ability to detect multiple reflections received at a pixel during a single detection frame and store TOF information for each reflection affords embodiments in accordance with the present disclosure significant advantages over prior art TOF LiDAR systems. To illustrate some of these advantages, an exemplary method for detecting one or more reflections at a pixel 404, is presented here. It should be noted that the embodiments and methods described herein demonstrate merely some approaches within the scope of the present disclosure and myriad alternative systems and methods are with this scope.

Figure 6:
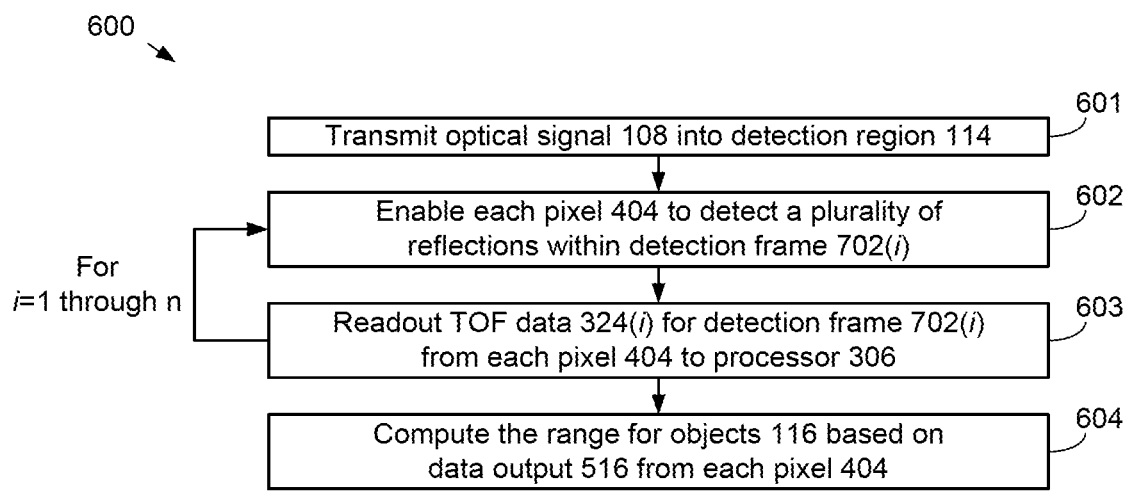
FIG. 6 depicts operations of a method for interrogating a detection region in accordance with the present disclosure.

FIG. 6 depicts operations of a method for interrogating a detection region in accordance with the present disclosure. Method 600 begins with operation 601, wherein transmitter 102 transmits output signal 108 toward detection region 114. As in system 100 described above, in the depicted example, output signal 108 includes a periodic train of n optical pulses (i.e., optical pulses 110-1 through 110-n) exhibiting a period T1. Method 600 is described herein with continuing reference to FIG. 3-5, as well as reference to FIGS. 7-10.

At operation 602, for each detection frame 802(i), where i=1 through n, each pixel 404 is enabled to detect one or more reflections 112 from detection region 114 within each detection frame 802(i). It should be noted that detection frames 802(1) through 802(n) collectively define an image frame analogous to image frame 202.

Figure 7:
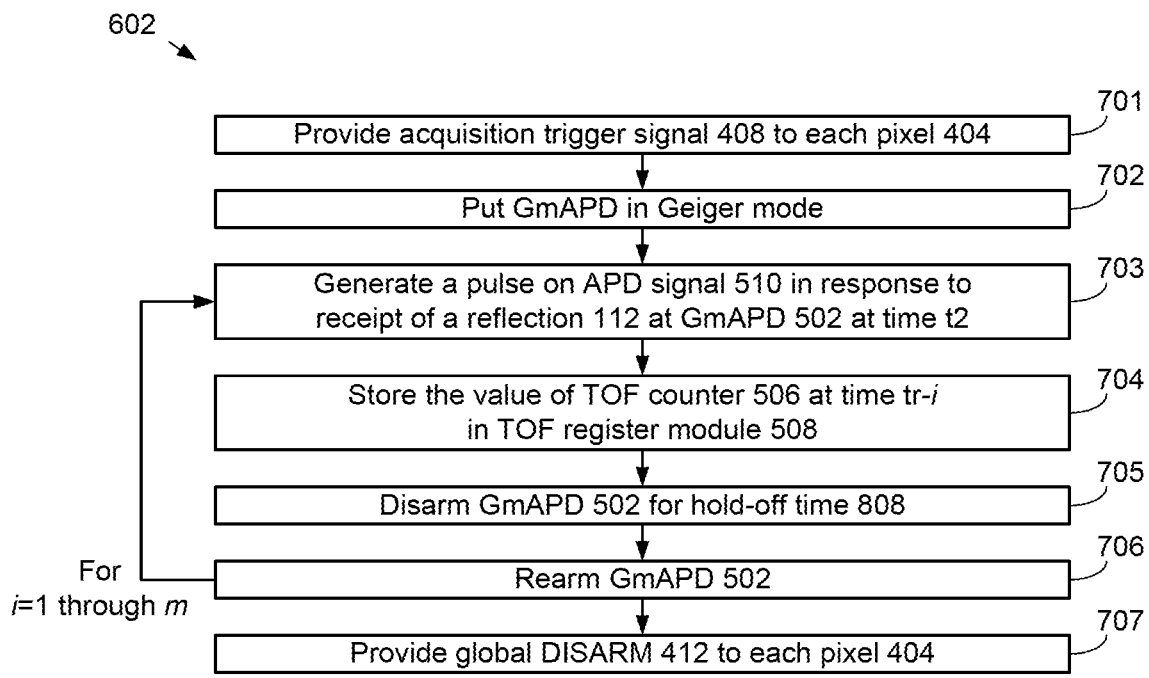
FIG. 7 depicts sub-operations of an exemplary sub-method suitable for enabling a pixel to detect a plurality of reflections during a single detection frame in accordance with the present disclosure.

FIG. 7 depicts sub-operations of an exemplary sub-method suitable for enabling a pixel to detect a plurality of reflections during a single detection frame in accordance with the present disclosure.

Figure 8:
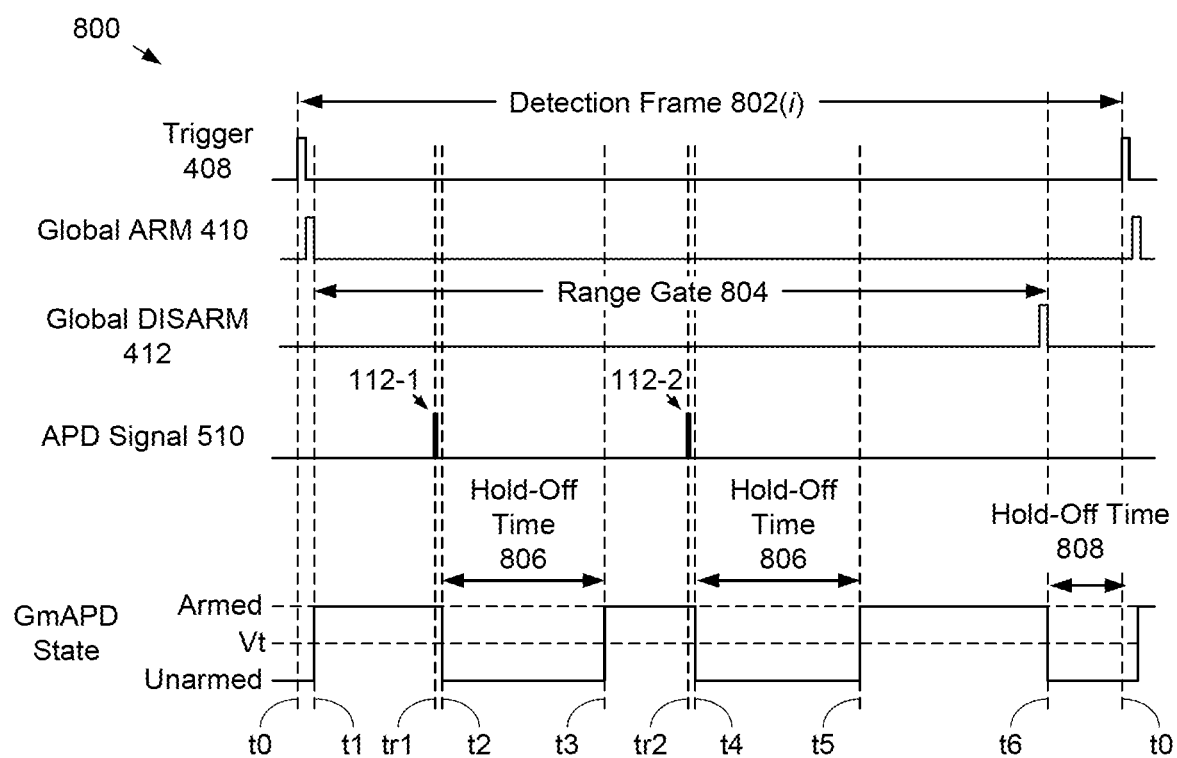
FIG. 8 depicts a timing diagram for a representative detection frame for one pixel 404 in accordance with sub-method 700.

FIG. 8 depicts a timing diagram for a representative detection frame for one pixel 404 in accordance with sub-method 700.

At sub-operation 701, processor 306 provides acquisition trigger signal 408 to pixel 404. As depicted in timing diagram 800, acquisition trigger signal 408 is provided at start time, t0, for detection frame 802(i). In the depicted example, acquisition trigger signal 408 is synchronized with the transmission of an optical pulse 110 into detection region 114; however, such synchronization is not required. It should be noted that trigger signal 408 is a global signal that is provided to every pixel 404 of detector 308.

At sub-operation 702, at time t1, processor 306 provides an electrical pulse on global ARM 410 to gating-signal controller 504. In response, the gating-signal controller provides an electrical pulse on gating signal 512, which arms GmAPD 502 to put it in Geiger mode. In the depicted example, time t1 is analogous to arming time ta, as described above; therefore, GmAPD 502 is armed at substantially the same time that each optical pulse 110 is transmitted. It should be noted, however that these actions can be performed at different times. It should be noted that global ARM 410 is also a global signal that is provided to every pixel 404 of detector 308.

The generation of the electrical pulse on global ARM 410 defines the beginning of range gate 804, during which GmAPD 502 can be operative for detecting a reflection 112.

At sub-operation 703, as seen in FIG. 8, first reflection 112-1 is received at GmAPD 502 at time tr-1. The receipt of reflection 112-1 gives rise to an avalanche-detection event that results in an electrical pulse on APD signal 510. One skilled in the art will recognize that a reflection can be received at GmAPD 502 at any arbitrary time within detection frame 802(i).

APD signal 510 is directed to gating-signal controller 504, TOF counter 506, and TOF register module 508.

At sub-operation 704, in response to the electrical pulse on APD signal 510, the value of TOF counter 506 at time tr-1 is captured and stored in a first TOF register in TOF register module 508 as TOF data 514-1. TOF data 514-1 functions as a TOF timestamp for reflection 112-1.

At sub-operation 705, in response to the electrical pulse on APD signal 510, gating-signal controller 504 disarms GmAPD 502 at time t2 by reducing gating signal 512 below threshold voltage Vt. In the depicted example, gating-signal controller 504 keeps GmAPD 502 disarmed for hold-off time 806, whose duration is defined by global hold-off time 420 and global ARM time 422. It should be noted that it is preferable to keep the global ARM time as short as possible to minimize excessive crosstalk caused by avalanches during the ARM period. It should also be noted that the delay between times tr-1 and t2 is typically very short, while the duration of hold-off time 806 is selected to mitigate false counts due to afterpulsing of GmAPD 502, in similar fashion to hold-off time 208 described above and with respect to system 100.

At sub-operation 706, gating-signal controller 504 rearms GmAPD 502 at the end of hold-off time 806 (i.e., at time t3) by increasing the level of gating signal 512 above the threshold voltage, Vt, of the GmAPD.

The functional sequence of sub-operations 703 through 706 are then repeated for the detection of subsequent reflections 112-2 through 112-m, where m is the total number of reflections 112 incident on GmAPD 502 during gating period 804.

For example, as depicted in FIG. 8, second reflection 112-2 is received at GmAPD 502 at arbitrary time tr-2, which gives rise to a second avalanche-detection event that results in a second electrical pulse on APD signal 510. The value of TOF counter 506 at time tr-2 is captured as TOF data 514-2 and stored in a different TOF register in TOF register module 510 as a TOF timestamp for reflection 112-2. GmAPD 502 is then quenched again at time t4 and rearmed at time t5 after hold-off time 806.

In the depicted example, only two reflections 112 are detected at pixel 404 during detection frame 802(i) (i.e., m=2). It will be clear to one skilled in the art, however, that m can have any value from 0 through n without departing from the scope of the present disclosure. In practice the value of m is limited only by the number of TOF registers included in TOF register module 508, the duration of range gate 804, and the length of hold-off time 806 required to mitigate false counts due to afterpulsing in GmAPD 502. In the depicted example, n=3, range gate 804 is approximately 2 microseconds, and hold-off time 806 is approximately 0.5 microseconds.

At sub-operation 707, processor 306 provides global DISARM 412 to gating-signal controller 504 at time t6, which defines the end of range gate 804. In response, the gating-signal controller disarms GmAPD 502 by reducing gating signal 512 below threshold voltage, Vt. Typically, time t6 is slightly before the end of detection frame 802(i), thereby establishing hold-off time 808 for all pixels 404 of the pixel array. Like hold-off time 208 described above, hold-off time 808 allows for trapped charges in the GmAPDs to detrap and recombine before the start of the next detection frame, thereby advantageously avoiding spurious avalanche events, such as dark counts due to afterpulsing.

Upon assertion of global DISARM 412, any hold-off time 806 in progress is terminated.

It should be noted that, like the pixels of receiver 104 described above, all pixels 404 of receiver 308 are armed synchronously at the beginning of each range gate 804 and disarmed synchronously at the end of each range gate 804 via global ARM 410 and global DISARM 412, respectively. The inclusion of gating-signal controller 504 within each pixel, however, enables each pixel to be disarmed, quenched, and rearmed several times within range gate 804 independently of the operation of any other pixel 404 within receiver 308. In other words, pixels 404 are configured such that they can be asynchronously disarmed and asynchronously rearmed during the range gate of each detection frame 802.

Returning now to method 600, at operation 603, TOF data 514-1 through 514-m is readout to processor 306 as data output 516. Typically, the TOF data is readout in response to the assertion of global DISARM 412 at time t6.

At operation 604, processor 306 computes the range for any objects 116 identified in detection region 114, where the range for such objects is estimated based on the data output signals 516 received from each pixel 404.

Figure 9:
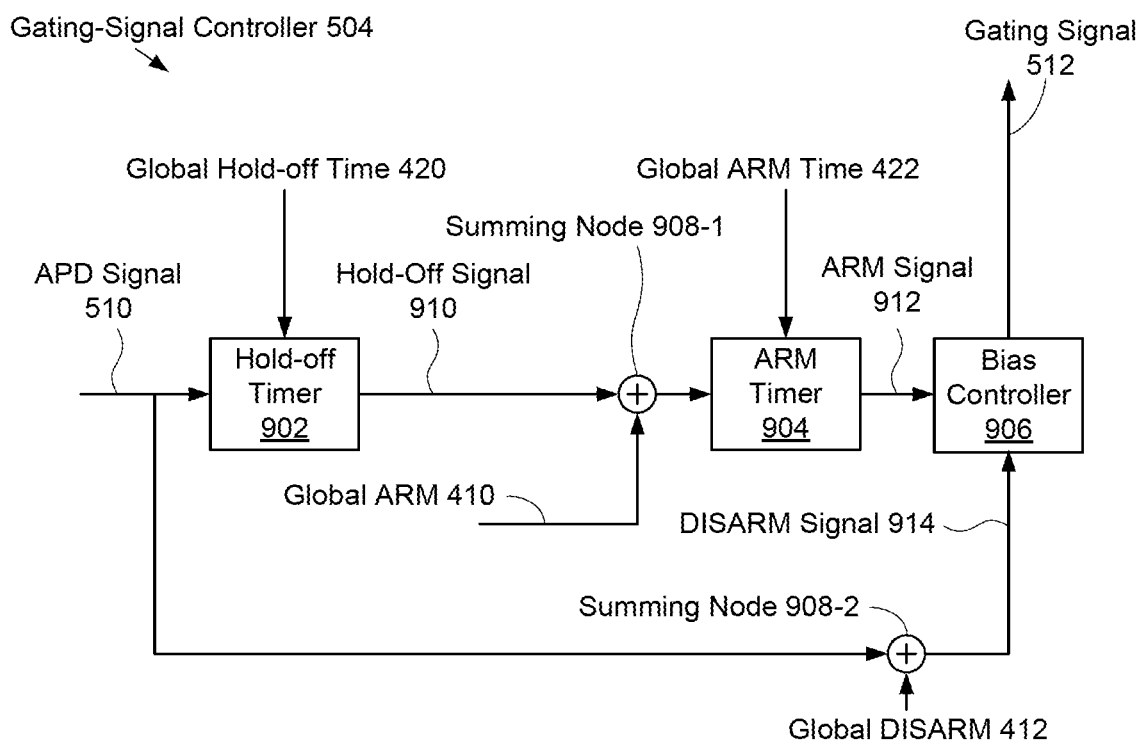
FIG. 9 depicts an exemplary circuit arrangement for a gating-signal controller in accordance with the present disclosure.

FIG. 9 depicts an exemplary circuit arrangement for a gating-signal controller in accordance with the present disclosure. Gating-signal controller 504 comprises hold-off timer 902, ARM timer 904, bias controller 906, and conventional summing nodes 908-1 and 908-2.

Hold-off timer 902 is a conventional programmable digital counter that tracks clock cycles on master clock 414. In response to receipt of an electrical pulse on APD signal 510, hold-off timer 902 holds hold-off signal 910 low for a hold-off period that is based on global hold-off time 420. Global hold-off time 420 is typically received from processor 306 or stored in a configuration register included in ROIC 310. Hold-off timer 902 is included in pixel 404 to keep GmAPD 502 in a disarmed state for period of time after an avalanche-detection event to allow trapped charges in its active region to recombine prior to rearming the GmAPD. The inclusion of hold-off timer 902, therefore, mitigates false alarms in system 300 generated due to afterpulsing in one or more pixels 404.

ARM timer 904 is a conventional programmable digital counter that is configured to provide ARM signal 912 to bias controller 906. ARM timer 904 asserts ARM signal 912 upon either the expiration of the hold-off period at hold-off timer 902 or the assertion of global ARM 410, the combination of which is received from summing node 908-1. The ARM period for ARM timer 904 is based on global ARM time 422, which is typically provided by processor 306 or stored in a configuration register included in ROIC 310.

Bias controller 906 is an electrical circuit configured to control the bias voltage applied to GmAPD 502 via gating signal 512. Bias controller 906 receives ARM signal 912 from ARM timer 904 and DISARM signal 914 from summing node 908-2. DISARM signal 914 is the combination of APD signal 510 and global DISARM 412 such that assertion of one or both of these signals gives rise to an assertion of DISARM signal 914.

Bias controller 906 arms GmAPD 502 in response to an assertion of ARM signal 912 and disarms GmAPD in response to an assertion of DISARM signal 914.

Gating-signal controller 504 is configured such that it disarms GmAPD 502 in response to either (1) assertion of global DISARM 412 or (2) detection of a reflection 112 at GmAPD 502, which gives rise to an electrical pulse on APD signal 510. In response to detection of a reflection, hold-off timer 902 initiates hold-off time 806 to ensure that the avalanche-detection event initiated by the absorption of the reflection is completely quenched and substantially all trapped charges have become untrapped before rearming the GmAPD. Alternately, in response to global DISARM 412, the hold-off timer does not initiate a hold-off time, but a direct quench is applied to the GmAPD for the duration of the global DISARM signal. This is typically applied at the end of a range gate sequence to bring all GmAPDs of pixel array 402 into a disarmed state at the end of detection frame 802.

Gating-signal controller 504 is further configured such that it puts GmAPD 502 into Geiger mode in response to either (1) an assertion of global ARM 410 or (2) automatically upon expiration of the hold-off period of hold-off timer 902.

It should be noted that gating-signal controller 504, as depicted in FIG. 9, is merely one example of a suitable configuration within the scope of the present disclosure.

Figure 10:
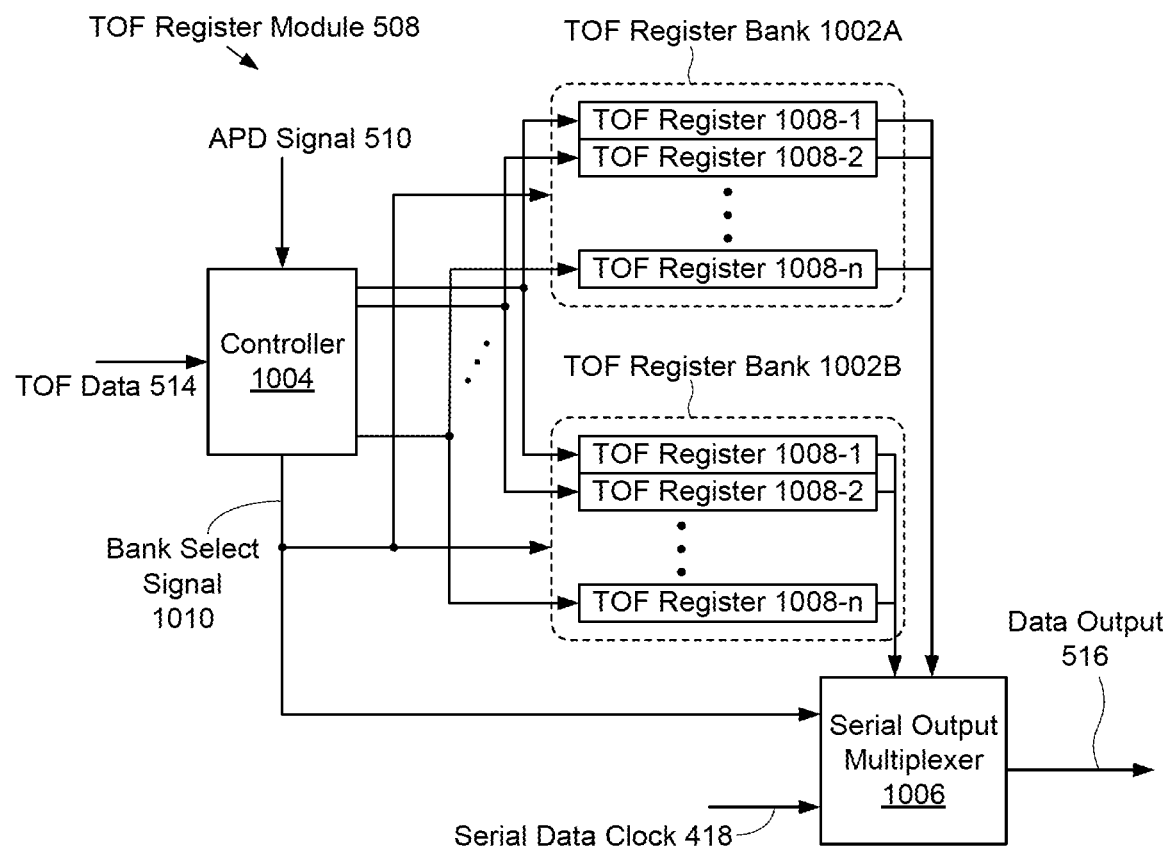
FIG. 10 depicts a functional block diagram of a TOF register module in accordance with the illustrative embodiment.

FIG. 10 depicts a functional block diagram of a TOF register module in accordance with the illustrative embodiment. TOF register module 508 includes TOF register banks 1002A and 1002B, controller 1004, and serial output multiplexer 1006.

Each of TOF register banks 1002A and 1002B (hereinafter referred to as banks 1002A and 1002B) includes substantially identical TOF registers 1008-1 through 1008-n (referred to, collectively, as TOF registers 1008).

Banks 1002A and 1002B are operatively coupled with controller 1004 such that TOF data for a current detection frame can be read into one of banks 1002A and 1002B while the other bank holds TOF data from the previous detection frame.

Banks 1002A and 1002B are also operatively coupled with serial output multiplexer 1006, which enables the TOF data stored in their registers to be serially readout to processor 306 as data output 516.

Controller 1004 is a circuit controller for receiving TOF data 514 from TOF counter 506 and storing the TOF data in one of TOF register banks 1002A and 1002B. Controller 1004 is configured to swap the functionality of banks 1002A and 1002B between capture and readout, thereby enabling "integrate-while-read" capability. In other words, TOF register module 508 can readout TOF data from the previous detection frame while, simultaneously, TOF data of the current detection frame is being stored. Capture and readout functionality of banks 1002A and 1002B is controlled by bank select signal 1010.

Serial output multiplexer 1006 is a conventional serial peripheral interface (SPI) that is operative for serially reading out the TOF data stored in TOF registers 1008 of one of banks 1002A and 1002B, as determined by bank select signal 1010 from controller 1004.

It should be noted that TOF register module 508, as depicted in FIG. 10, is merely one example of a suitable configuration for a TOF register module within the scope of the present disclosure. For example, in some embodiments, only one TOF register bank is included in TOF register module 508. In some embodiments, more than two TOF register banks are included in TOF register module 508.

It is to be understood that the disclosure teaches just some examples of embodiments of the invention and that many variations of the invention can easily be devised by those skilled in the art after reading this disclosure and that the scope of the present invention is to be determined by the following claims.

What is claimed is:

1. A light detection and ranging (LiDAR) system comprising:
   an optical source for transmitting a series of periodic optical pulses toward a detection region; and
   a receiver comprising a plurality of pixels,
   wherein a pixel of the plurality of pixels is configured to detect a plurality of reflections of an optical pulse of the series of periodic optical pulses during a detection frame of a plurality of detection frames, the detection frame having a duration based on a period of the series of periodic optical pulses and a start time based on transmission of another one of optical pulse of the series of periodic optical pulses, and
   wherein the pixel comprises:
      a Geiger-mode avalanche photodiode (GmAPD) configured to:
         generate an APD signal in response to each reflection of the plurality of reflections being detected during the detection frame,
         be armed into a Geiger mode in response to a gating signal being in an asserted state, and
         be disarmed out of the Geiger mode in response to the gating signal being in a non-asserted state;
      a gating-signal controller comprising a summing node configured to combine the APD signal and a global disarm signal as a disarm signal, wherein the global disarm signal is received by the each pixel of the plurality of pixels;
      a time-of-flight (TOF) counter for tracking a time between transmission of the optical pulse and detection of the plurality of reflections of the optical pulse; and
      a TOF register module for storing TOF data associated with the plurality of reflections of the optical pulse.

2. The LiDAR system of claim 1, further comprising a processor configured to develop a map of the detection region based on the TOF data stored in the TOF register module of at least one pixel of the plurality of pixels.

3. The LiDAR system of claim 1, further comprising a processor configured to provide at least one global signal to the each pixel of the plurality of pixels, and wherein the global signal is selected from the group consisting of a global arm signal, a global disarm signal, and a master clock.

4. The LiDAR system of claim 1, wherein the gating-signal controller is configured to disarm the GmAPD in response to the detection of the plurality of reflections or to a global disarm signal being received by the each pixel of the plurality of pixels.

5. The LiDAR system of claim 1, wherein the gating-signal controller further comprises:
   a hold-off timer configured to generate a hold-off signal in response to an assertion of the APD signal from the GmAPD;
   an arm timer configured to assert an arm signal in response to an assertion of the hold-off signal and a global arm signal, wherein the global arm signal is received by the each pixel of the plurality of pixels; and
   a bias controller configured to provide the gating signal, wherein the bias controller provides the gating signal in its asserted state in response to an assertion of the arm signal and provides the gating signal in its non-asserted state in response to an assertion of the disarm signal.

6. The LiDAR system of claim 1, wherein the TOF register module comprises:
   a first TOF register bank comprising a first plurality of TOF registers;
   a second TOF register bank comprising a second plurality of TOF registers; and
   a controller configured to enable storage of TOF data in one of the first and second register banks while enabling readout of TOF data from the other one of the first and second register banks.

7. A method for estimating a range for at least one object in a detection region, the method comprising:
   transmitting a series of periodic optical pulses toward the detection region;
   defining a plurality of detection frames, wherein each detection frame of the plurality of detection frames has a duration based on a period of the series of periodic optical pulses and a start time based on transmission of a respective one of optical pulse of the series of periodic optical pulses;
   receiving a first reflection of a first optical pulse of the series of periodic optical pulses at a first pixel of a receiver during a first detection frame of the plurality of the detection frames, wherein the first pixel comprises a first Geiger-mode avalanche photodiode (GmAPD), and wherein a first avalanche-detection event is triggered in the GmAPD in response to receiving the first reflection;
   asynchronously disarming the first GmAPD to quench the first avalanche-detection event;
   asynchronously arming the first GmAPD to enable a second avalanche-detection event in response to receiving a second reflection of the first optical pulse of the series of periodic optical pulses during the first detection frame; and
   disarming the first GmAPD and a second GmAPD included in a second pixel of the receiver, wherein the first GmAPD and second GmAPD are disarmed synchronously at a first time that is based on a start time of a second detection frame of the plurality of detection frames.

8. The method of claim 7, further comprising synchronously arming the first GmAPD and the second GmAPD at a second time that is based on the start time of the second detection frame.

9. The method of claim 7, further comprising tracking a time between transmission of the first optical pulse and receipt of the first reflection.

10. The method of claim 7, further comprising:
    storing a first time-of-flight (TOF) value in a first TOF register, the first TOF value being based on a first delay between transmission of the first optical pulse and receipt of the first reflection at the first GmAPD; and
    storing a second TOF value in a second TOF register, the second TOF value being based on a second delay between the transmission of the first optical pulse and receipt of a second reflection of the first optical pulse at the first GmAPD during the first detection frame.

11. The method of claim 10, further comprising:
    storing a third TOF value in a third TOF register, the third TOF value being based on a third delay between the transmission of a second optical pulse of the series of periodic optical pulses and receipt of a third reflection of the second optical pulse at the first GmAPD during a second detection frame of the plurality detection frames;
    storing a fourth TOF value in a fourth TOF register, the fourth TOF value being based on a fourth delay between the transmission of the second optical pulse and receipt of a fourth reflection of the second optical pulse at the first GmAPD during the second detection frame; and providing the first and second TOF values to a processor while the third and fourth TOF values are being stored.

12. A light detection and ranging (LiDAR) system comprising:
an optical source for transmitting a series of periodic optical pulses toward a detection region; and
a receiver comprising a plurality of pixels,
wherein each pixel of the plurality of pixels is configured to detect a plurality of reflections of an optical pulse of the series of periodic optical pulses during a detection frame of a plurality of detection frames, and
wherein the each pixel comprises:
  a Geiger-mode avalanche photodiode (GmAPD) configured to generate an APD signal in response to each reflection of the plurality of reflections being detected during the detection frame;
  a gating-signal controller configured to asynchronously arm and asynchronously disarm the GmAPD and comprising a summing node configured to combine the APD signal and a global disarm signal as a disarm signal, wherein the global disarm signal is received by the each pixel of the plurality of pixels;
  a counter for determining a delay between transmission of the optical pulse and receipt of each reflection of the plurality of reflections of the optical pulse; and
  a plurality of time-of-flight (TOF) registers for storing TOF data corresponding to each reflection of the plurality of reflections.

13. The LiDAR system of claim 12, further comprising a processor configured to develop a map of the detection region based on the TOF data stored in the TOF registers of at least one pixel of the plurality pixels.

14. The LiDAR system of claim 12, wherein the receiver is configured to enable synchronous arming of the GmAPDs of the plurality of pixels at a first time based on a start time of each detection frame of the plurality of detection frames.

15. The LiDAR system of claim 14, wherein the receiver is configured to enable synchronous disarming of the GmAPDs of the plurality of pixels at a second time based on transmission of another optical pulse of the series of periodic optical pulses.

16. The LiDAR system of claim 12, further comprising a processor configured to provide at least one global signal to the each pixel of the plurality of pixels, and wherein the global signal is selected from the group consisting of a global arm signal, a global disarm signal, and a master clock.

17. The LiDAR system of claim 12, wherein the gating-signal controller comprises a hold-off timer configured to generate the hold-off signal in response to the assertion of the APD signal.

18. The LiDAR system of claim 12, wherein the gating-signal controller comprises an arm timer configured to assert an arm signal in response to an assertion of a hold-off signal or a global arm signal, wherein the global arm signal is received by the each pixel of the plurality of pixels.

19. The LiDAR system of claim 12, wherein the gating-signal controller further comprises another summing node configured to combine the APD signal from the GmAPD and a global arm signal to output an arm signal, wherein the global arm signal is received by the each pixel of the plurality of pixels.

\* \* \* \* \*